United States Patent
Kashiwa et al.

[11] Patent Number: 5,773,049
[45] Date of Patent: Jun. 30, 1998

[54] TWO-LAYER FOAM INJECTION MOLDING MACHINE

[75] Inventors: Masahiko Kashiwa; Tsutomu Nagaoka; Naoki Takeuchi, all of Takasago, Japan

[73] Assignee: Kabushiki Kaisha Kobe Seiko Sho, Kobe, Japan

[21] Appl. No.: 663,312
[22] PCT Filed: Dec. 28, 1994
[86] PCT No.: PCT/JP94/02277
  § 371 Date: Jun. 27, 1996
  § 102(e) Date: Jun. 27, 1996
[87] PCT Pub. No.: WO95/18002
  PCT Pub. Date: Jul. 6, 1995

[30] Foreign Application Priority Data

Dec. 29, 1993 [JP] Japan ................................ 5-352535
Dec. 29, 1993 [JP] Japan ................................ 5-353866

[51] Int. Cl.⁶ .................................................. B29C 45/16
[52] U.S. Cl. .................... 425/572; 264/255; 264/297.2; 264/328.8; 425/574; 425/576
[58] Field of Search .......................... 264/255, 328.8, 264/297.2; 425/572, 574, 575, 576

[56] References Cited

U.S. PATENT DOCUMENTS

| 4,734,023 | 3/1988 | Nesch et al. | 425/572 |
| 5,030,406 | 7/1991 | Sorensen | 264/255 |

FOREIGN PATENT DOCUMENTS

| 62-41086 | 1/1987 | Japan . |
| 62-59654 | 11/1987 | Japan . |
| 3-24920 | 1/1991 | Japan . |

*Primary Examiner*—Tim Heitbrink
*Attorney, Agent, or Firm*—Oblon, Spivak, McClelland, Maier & Neustadt, P.C.

[57] ABSTRACT

A two-layer foam injection molding machine for molding foam moldings in which a surface member composed of a foam layer and a skin layer on the surface of the foam layer is laminated in a body on a core member made from a hard resin. The two-layer foam injection molding machine comprises, mainly, a fixed plate attached to a primary mold for molding the core member and provided with a primary injection unit for supplying the core member; a rotary plate arranged so as to be openable and closable from and to the fixed plate and having a pair of a first mold facing the primary mold and a second mold, for molding the surface member, facing a secondary mold and having the same shape as the first mold, in a manner capable of switching them by turning; a movable plate arranged so as to be openable and closable from and to the rotary plate, attached to the secondary mold and provided with a secondary injection unit; first mold clamping means for clamping the primary mold of the fixed plate and the first mold or the second mold of the rotary plate; second mold clamping means for clamping the secondary mold of the movable plate and the second mold or the first mold of the rotary plate; and mold opening means provided so as to separate the movable plate and the rotary plate to provide a space between the second mold or the first mold and the secondary mold held to be openable.

3 Claims, 16 Drawing Sheets

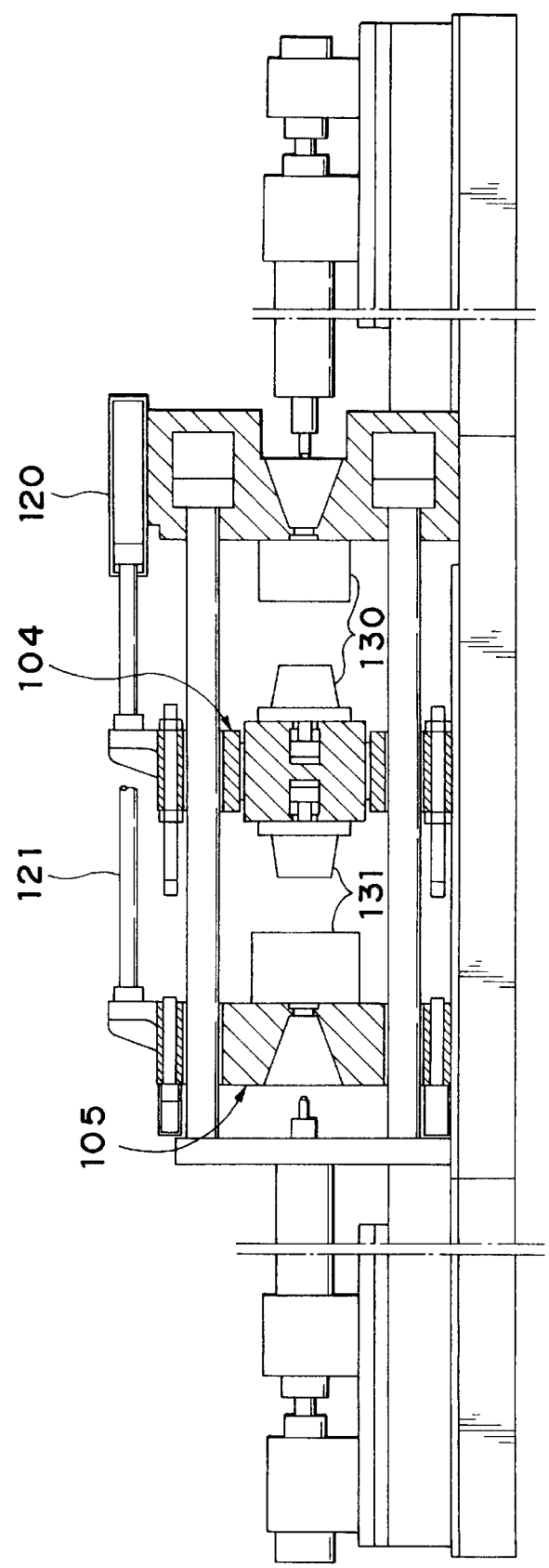

TWO-LAYER FOAM INJECTION MOLDING MACHINE

BACKGROUND OF THE INVENTION

1. Field of the Invention

The present invention relates to a two-layer foam injection molding machine for obtaining, by means of injection molding, composite foam moldings in which a surface member having a skin layer on a surface of a cushiony foam layer is formed in a body on one side of a core member made from a hard resin and more particularly to a machine which provides two-layer foam moldings having a desirable touch and surface continuously and efficiently under control of foaming states of a foaming resin.

2. Description of Related Art

As a foam injection molding method for obtaining two-layer foam moldings of this type, one disclosed in Japanese Patent Publication No. 51-8424 has been known. This method provides two-layer foam moldings having a skin layer cold-set on a surface of a mold and a foam layer formed within molds by injecting a foaming resin containing a foaming agent into a space of the molds held to be openable and then foaming the resin by expanding the space by opening the molds. With regard to this two-layer foam injection molding method, however, although a circuit structure for changing a mold opening speed per injection by providing a flow regulating valve in a mold opening hydraulic circuit is disclosed in the above-mentioned Patent Publication, no means for changing the mold opening speed during injection is disclosed.

In recent years, this two-layer foam injection molding method has come to be applied to mold interior panels of cars because it allows a yield of the resin to be kept high and to be able to mold continuously as compared to methods in which the skin layer is molded separately by a vacuum molding or the like.

The car interior panels are required to have a soft surface having a soft touch. A selection of a proper material is also important to obtain such a touch, and a thermo-plastic elastomer which has a rubber-like elasticity in normal temperature and which is plasticized and can be injection-molded in high temperature has come to be used as a material for forming the skin layer and the foam layer.

When the prior art two-layer foam injection molding method was applied to mold the thermoplastic elastomer, however, no moldings having a desirable touch and surface condition could be obtained because a foam expansion ratio or foam cell size was not adequate.

Due to that, a foam injection molding method which can maintain an adequate foam expansion ratio or foam cell size and can provide foam moldings having a desirable touch has been studied. Then, based on findings obtained through numerous experiments, the applicant of the present application has devised and applied a two-layer foam injection molding method which can provide foam moldings having foam cells in an adequate size and an adequate expansion ratio as well as a soft touch and an excellent surface condition whose crimp or crepe pattern transfer is good by controlling a foaming process by changing a mold opening speed (space expanding rate) during injection (Japanese Patent Application No. Hei. 5-257781).

To obtain such two-layer moldings efficiently, it is preferable to use a two-layer foam injection molding machine which can injection-mold two-layer moldings in which two kinds of different materials or different color resin materials are laminated by one machine as disclosed in Japanese Patent Publication No. Hei. 3-51207.

The two-layer foam injection molding machine in the above-mentioned Patent Publication is provided with a rotary plate between a fixed plate and a movable plate to perform primary molding between the fixed plate and the rotary plate and secondary molding between the rotary plate and the movable plate, respectively. That is, a primary molding is obtained by injecting a resin into primary molds between the fixed plate and the rotary plate and then a two-layer secondary molding is obtained by turning the rotary plate by 180° and by injecting another resin into secondary molds, where the primary molding exist, between the rotary plate and the fixed plate. A type of mold clamping mechanism which co-clamps the fixed plate, the rotary plate and the movable plate through the intermediary of tie bars in a closed state is used.

However, while it is necessary to open the molds by a predetermined distance between the rotary plate and the movable plate to foam and to obtain the two-layer foam moldings described above, the type of machine which co-clamps the plates as disclosed in the above-mentioned Patent Publication No. Hei. 3-51207 has had a problem that when the secondary molds are opened, the primary molds are also opened at the same time, thus becoming uncontrollable.

Accordingly, it is an object of the present invention to solve the aforementioned problem of the prior art by providing a two-layer foam injection molding machine which allows normal injection molding to be performed in primary and secondary molds, foam injection molding to be performed in the secondary molds by opening the molds and the above-mentioned two-layer foam injection molding method to be adequately put into practical use and which is suited especially for molding mass-produced items such as car interior panels.

SUMMARY OF THE INVENTION

In order to achieve the aforementioned goal, an inventive two-layer foam injection molding machine for molding foam moldings in which a surface member composed of a foam layer and a skin layer on the surface of the foam layer is laminated in a body on a core member made from a hard resin comprises a fixed plate attached with a primary mold for molding the core member and provided with a primary injection unit for supplying a material of the core member; a rotary plate arranged so as to be openable/closable from/to the fixed plate and having a pair of a first mold facing the primary mold and a second mold, for molding the surface member, facing a secondary mold and having the same shape as the first mold in a manner capable of switching them by turning; a movable plate arranged so as to be openable/closable from/to the rotary plate, attached to the secondary mold and provided with a secondary injection unit for supplying a material of the surface member; first mold clamping means for clamping the primary mold of the fixed plate and the first or second mold of the rotary plate; second mold clamping means for clamping the secondary mold of the movable plate and the second or first mold of the rotary plate; and mold opening means provided so as to separate the movable plate and the rotary plate to expand a space between the second or first mold and the secondary mold held to be openable.

Further, it is preferable to arrange the machine so that the second mold clamping means can release the molds while the first mold clamping means clamps the molds and so that the mold opening means expands the space between the second or first mold and the secondary mold by a predetermined distance while the second clamping means releases the molds.

A molding cycle performed by means of the two-layer foam injection molding machine constructed as described above is effected as follows. The movable plate, the rotary plate and the fixed plate are closed by the first and second mold clamping means and a core material is injected from the primary injection unit to a first cavity which is a space created between the first mold of the rotary plate and the primary mold of the fixed plate to create the core member. At the same time, a surface material is injected from the secondary injection unit to a space created between the core member adhering on the second mold of the rotary plate and the secondary mold of the movable plate to create the skin layer. Next, the space between the second mold and the secondary mold is expanded by the mold opening means to form the foam layer. Then, after opening the molds by opening the movable plate, the rotary plate and the fixed plate, the foam molding is taken out and the first mold of the rotary plate is switched with the second mold to cause the first mold on which the molded core member is adhering to face to the secondary mold. Because the surface member and the core member are molded simultaneously by one machine by repeating above-mentioned processes, the foam moldings may be continuously molded, thus significantly improving the production efficiency.

Further, because the mold opening speed and the predetermined distance of the opened molds are controlled in high precision by the mold opening means, foam moldings having an excellent appearance and soft touch brought about by a desirable expansion ratio and good surface condition may be obtained. The mold opening means is operated while releasing the molds by the second mold clamping means to control the mold opening speed in high precision.

The specific nature of the invention, as well as other objects, uses and advantages thereof, will clearly appear from the description and from the accompanying drawings.

BRIEF DESCRIPTION OF DRAWINGS

FIG. 14 is a longitudinal section view of the other inventive two-layer foam injection molding machine in a fully opened state;

DESCRIPTION OF PREFERRED EMBODIMENTS

Figure 1:
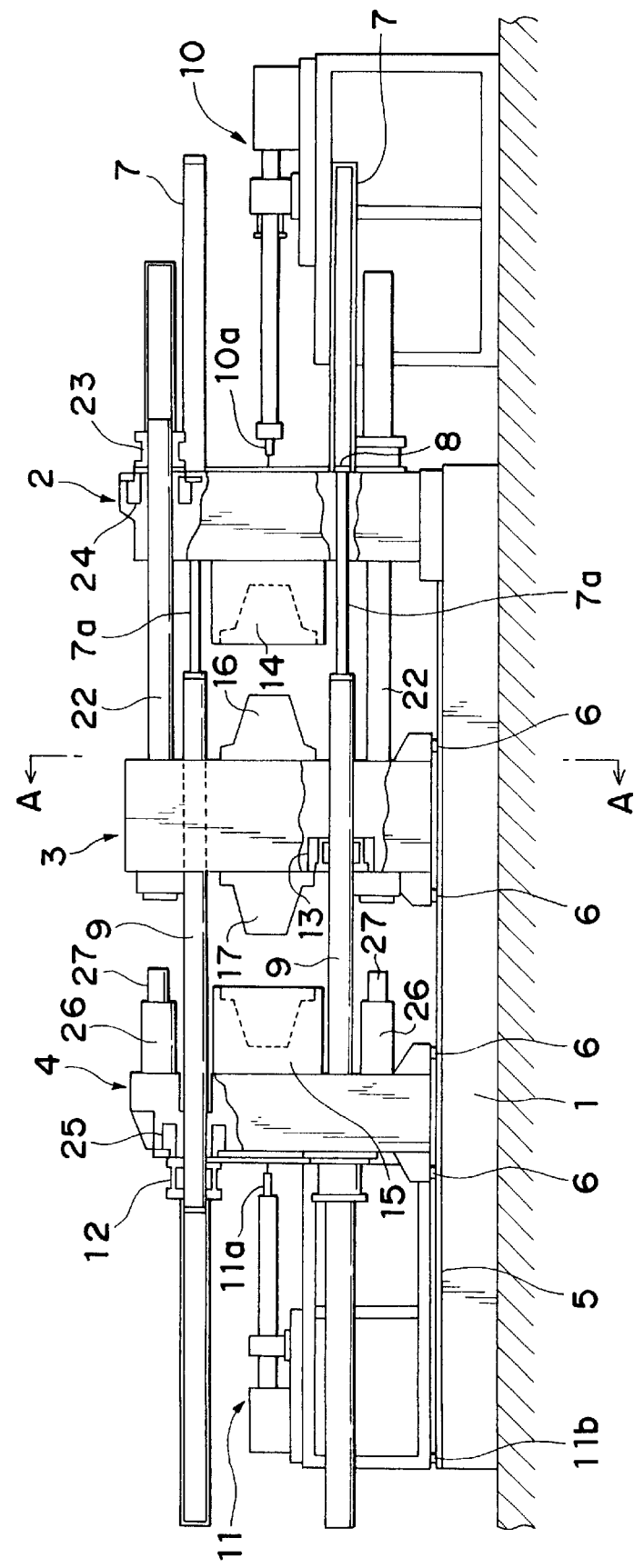
FIG. 1 is a partly broken-out side view showing one embodiment of an inventive injection molding machine.
Figure 2:
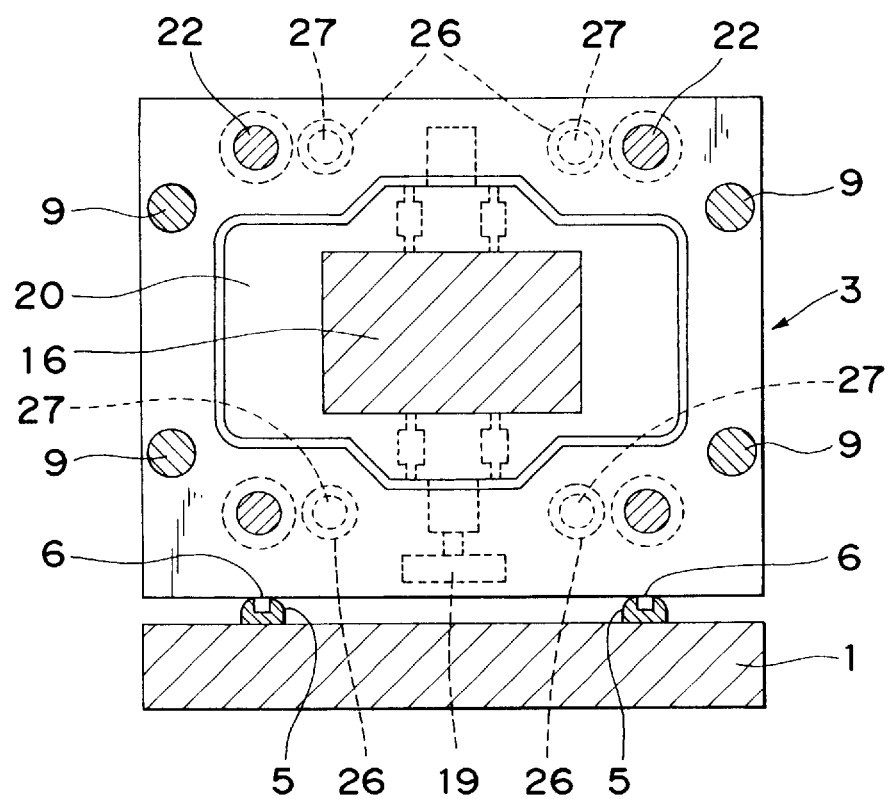
FIG. 2 is a section view along a line A—A in FIG. 1.

Preferred embodiments of the present invention will be explained below with reference to the drawings. FIG. 1 is a partly broken-out side view showing an inventive two-layer foam injection molding machine and FIG. 2 is a section view along a line A—A in FIG. 1;

In FIG. 1, a fixed plate 2 is fixed on a bed 1 and a rotary plate 3 and a movable plate 4 are supported by wheels on guide rails 5 laid on the bed 1 so as to be openable in the horizontal direction in the figure. Four moving cylinders 7 are fixed to the fixed plate 2 so that rods 7a of pistons 8 thereof penetrate therethrough by disposing in a rectangular shape so as to keep a balance as shown in FIG. 2. Each screwed tie rod 9 connected to the end of each rod 7a extends in the rear direction penetrating through the rotary plate 3 and the movable plate 4. The movable plate 4 is provided with an openable half nut 12 for gripping, in a manner freely engaging with, the screw at the end portion of each tie rod 9 and the rotary plate 3 is provided with an openable half nut 13 for gripping, in a manner of freely engaging with, the screw at the middle portion of each tie rod 9. The movable plate 4 and the rotary plate 3 are opened/closed by moving them in the direction of approaching/receding to/from the fixed plate 2 by driving the moving cylinders 7 after closing each of the half nuts 12 and 13 by means of a driving unit such as a hydraulic cylinder or the like not shown. It is then possible to select to move the rotary plate 3 or the movable plate 4 solely or to move them in linkage by opening/closing the half nuts 12 and 13.

A primary injection unit 10 for injecting a resin material for molding a core member in a melt state is provided facing the fixed plate 2. Meanwhile, a secondary injection unit 11 for injecting a foaming material for molding a surface member in a melt state is provided facing the movable plate 4 while being supported movably by wheels 11b on the guide rails 5 so that it moves in a body with the movable plate 4.

A primary cavity 14 is attached to the fixed plate 2 at the position facing nozzle 10a of the primary injection unit 10. A secondary cavity 15 is attached to the movable plate 4 at the position facing a nozzle 11a of the secondary injection unit 11. Meanwhile, a first core 16 and a second core 17 having the same shape are attached, respectively, to both sides of the rotary plate 3 at the positions facing primary cavities 14 and 15 described above. The rotary plate 3 is arranged so that a rotator 20 on which the cores 16 and 17 are fixed at both sides thereof is turned by 180° of rotary angle each about an axial line in the vertical direction by means of a turning unit 19 such as a rotary actuator as shown in FIG. 2. The rotary plate 3 is provided with four projecting screwed tie rods 22 which are disposed so as to penetrate through the fixed plate 2 in a rectangular shape to keep a balance. An openable half nut 23 which is connected to a piston of a mold clamping cylinder 24 which is embedded in the fixed plate 2 can grip the screw of the tie rod 22. Accordingly, the molds 14 and 16 are clamped when the rotary plate 3 is brought closer to the fixed plate 2 by the moving cylinder 7, the half nut 23 is closed and the mold clamping cylinder 24 is actuated. Similarly, the movable plate 4 is provided with a molding clamping cylinder 25 in a state wherein a piston thereof is connected with the half nut 12 described above and the molds 15 and 17 are clamped when the movable plate 4 is brought closer to the rotary plate 3 by the moving cylinder 7, the half nuts 13 and 12 are closed and the clamping cylinder 25 is actuated.

Then, the movable plate 4 is provided with four mold opening cylinders 26, which is one of main points of the present invention, in a rectangular shape to keep a balance as shown in FIG. 2 and a piston rod 27 of each opening cylinder 26 faces one surface of the rotary plate 3. This piston rod 27 abuts the facing surface of the rotary plate 3 in a manner freely approachable/separable as the movable plate 4 moves.

Figure 3:
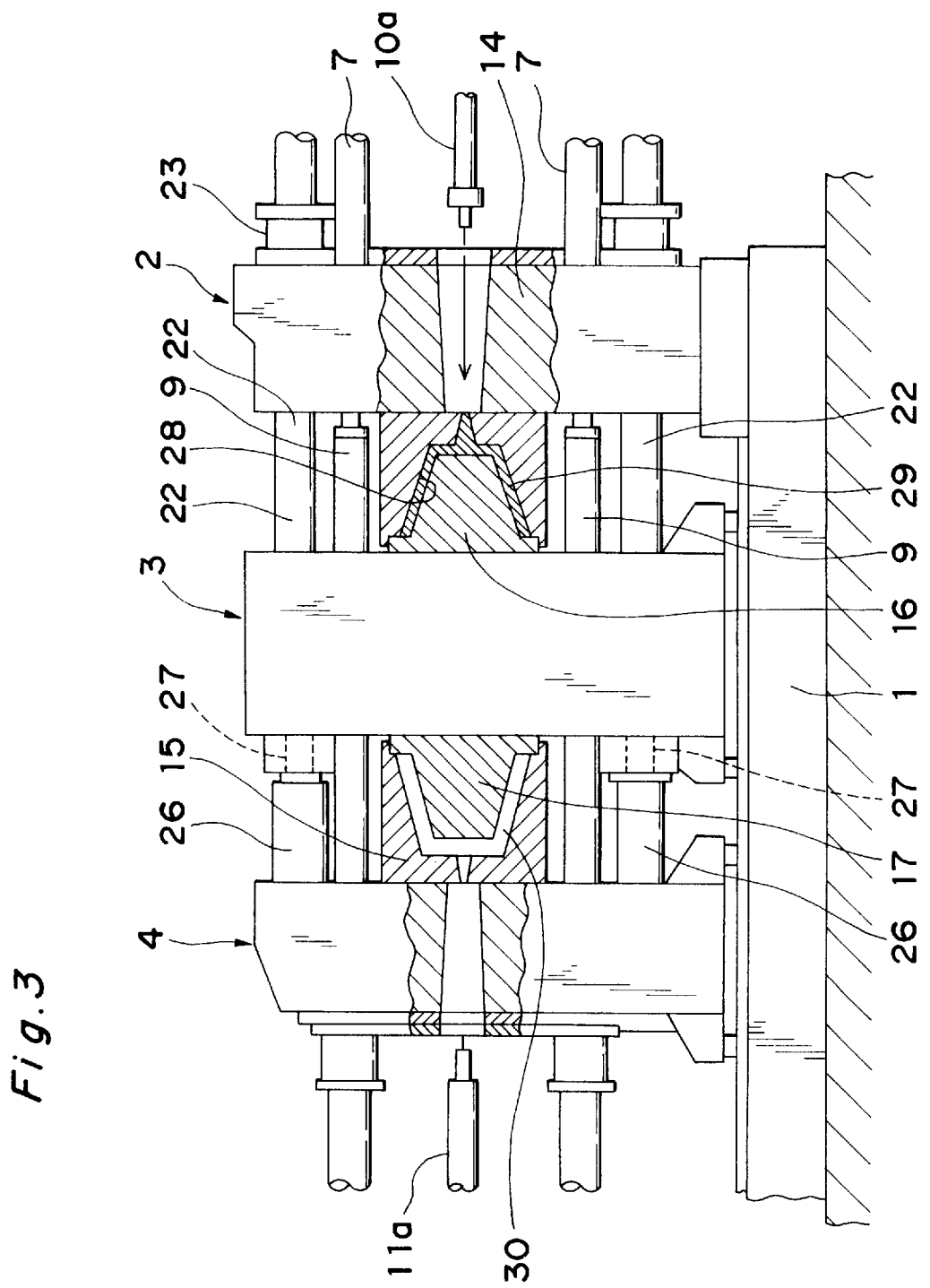
FIG. 3 is a partly broken-out side view showing a process for molding only a core member in the molding machine.

A production process of two-layer foam moldings made by the two-layer foam injection molding machine constructed as described above will be explained below with reference to FIGS. 3 through 11 which show the process sequentially. While this machine can produce composite foam moldings very efficiently by repeating a molding cycle of the series of processes, it produces only a core member as a primary molding only in the first molding cycle. That is, the movable plate 4 and the rotary plate 3 are activated as described later to move toward the fixed plate 2 to clamp the primary cavity 14 and the first core 16 and the secondary cavity 15 and the second core 17, respectively, in contact as shown in FIG. 3. Then, a core material of a thermoplastic resin is supplied from the primary injection unit 10 to a first cavity 28 created by the primary molds 14 and 16 to mold a core member 29 as the primary molding.

Figure 4:
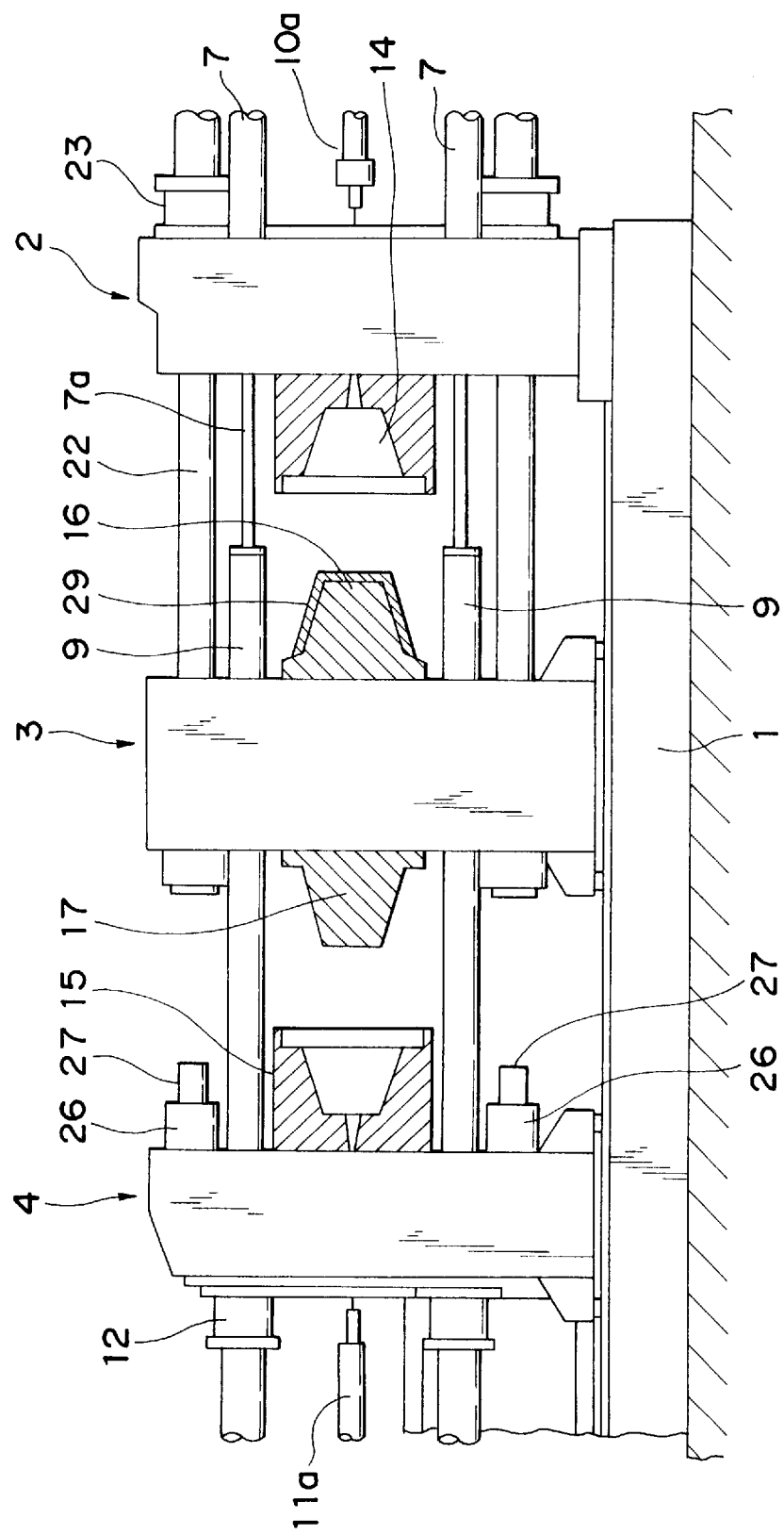
FIG. 4 is a partly broken-out side view showing a state in which the primary and secondary molds are opened from the state in FIG. 3.
Figure 5:
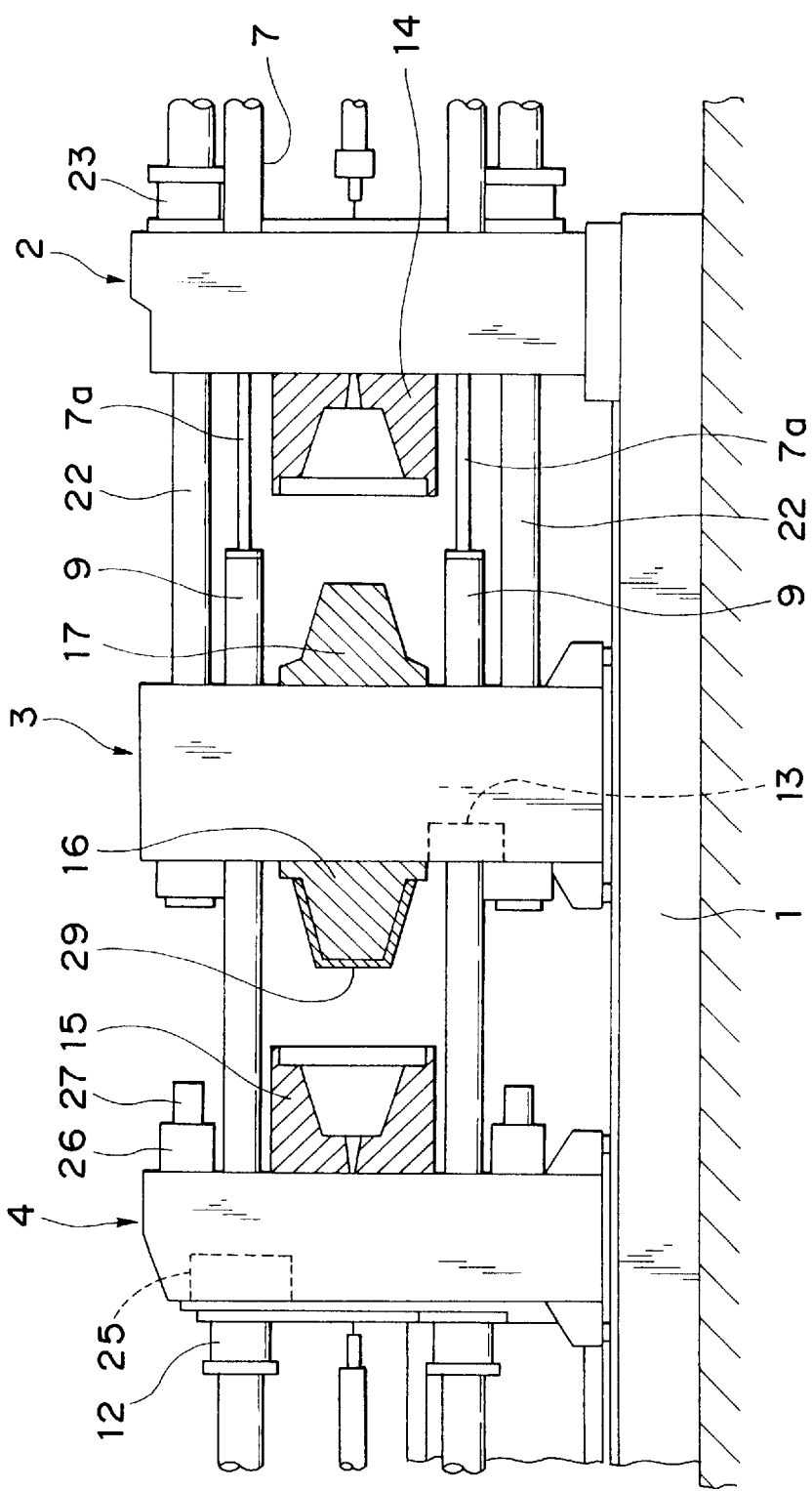
FIG. 5 is a partly broken-out side view showing an initial state of a molding cycle of the machine.

After completing the above-mentioned molding, the rotary plate 3 is separated from the fixed plate 2 while leaving the core member 29 in adhesion with the first core 16 and the movable plate 4 is separated from the rotary plate 3 to open the primary molds 14 and 16 and the secondary molds 15 and 17, respectively, as shown in FIG. 4. Then, when the rotary plate 3 is turned by 180° by driving the turning unit 19, an initial state of the inventive molding cycle in which the core member 29 faces the movable plate 4 is brought about as shown in FIG. 5.

Figure 6:
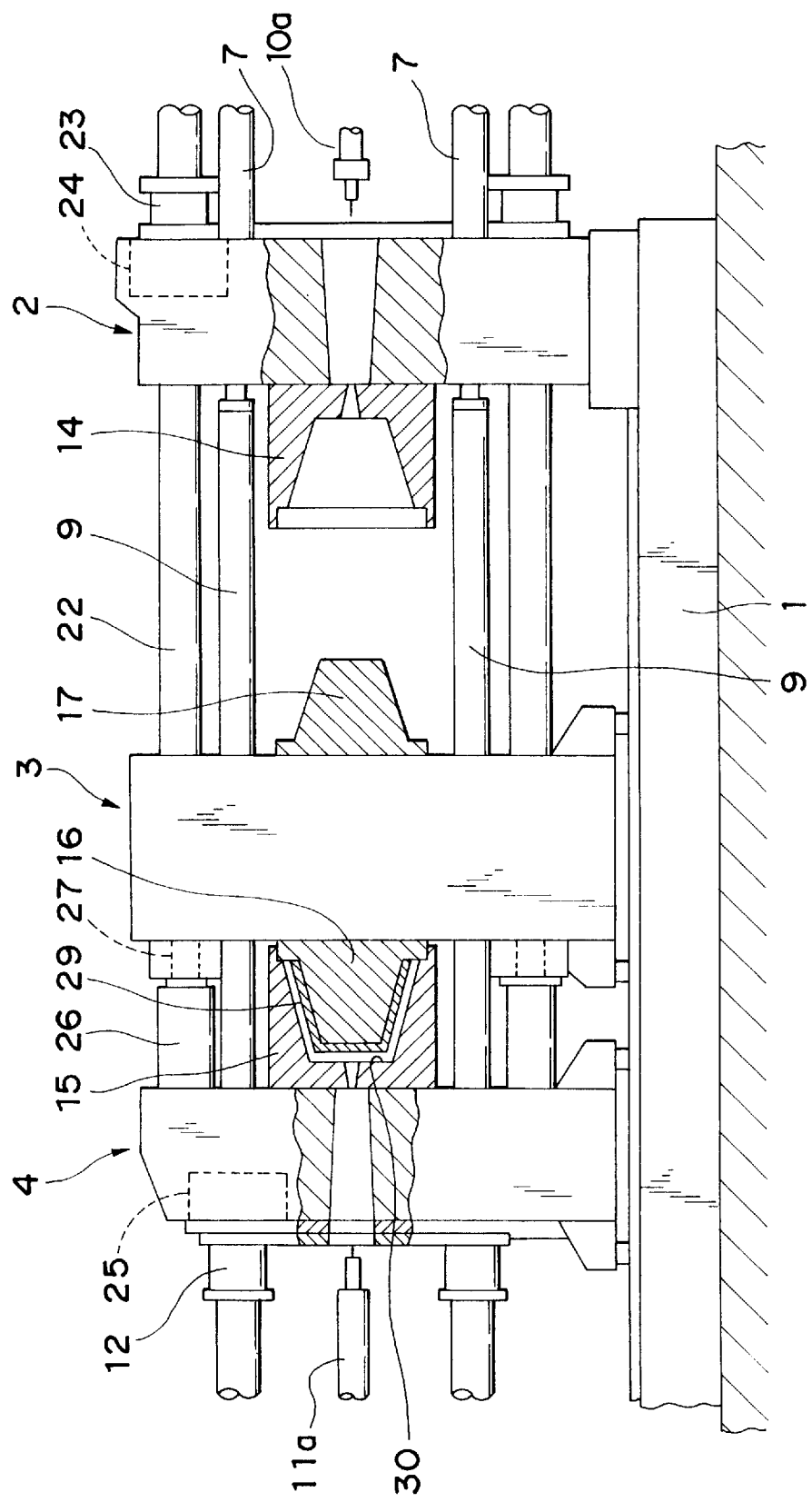
FIG. 6 is a partly broken-out side view showing a state in which the secondary molds of the machine are closed.

The inventive molding cycle of the series of processes of the machine described above is started from the initial state in FIG. 5. At first, the half nut 12 shown in FIG. 1 is closed by a driving unit (not shown) to connect the movable plate 4 with the tie rod 9 so that they move in a body. Then, the moving cylinder 7 is actuated so as to suction the piston 8. With the move of the piston 8, the movable plate 4 is moved toward the rotary plate 3 via the tie rod 9 and the secondary molds 15 and 16 are clamped in contact as shown in FIG. 6. At this time, a second cavity 30 is created between the core member 29 and the secondary cavity 15.

Figure 7:
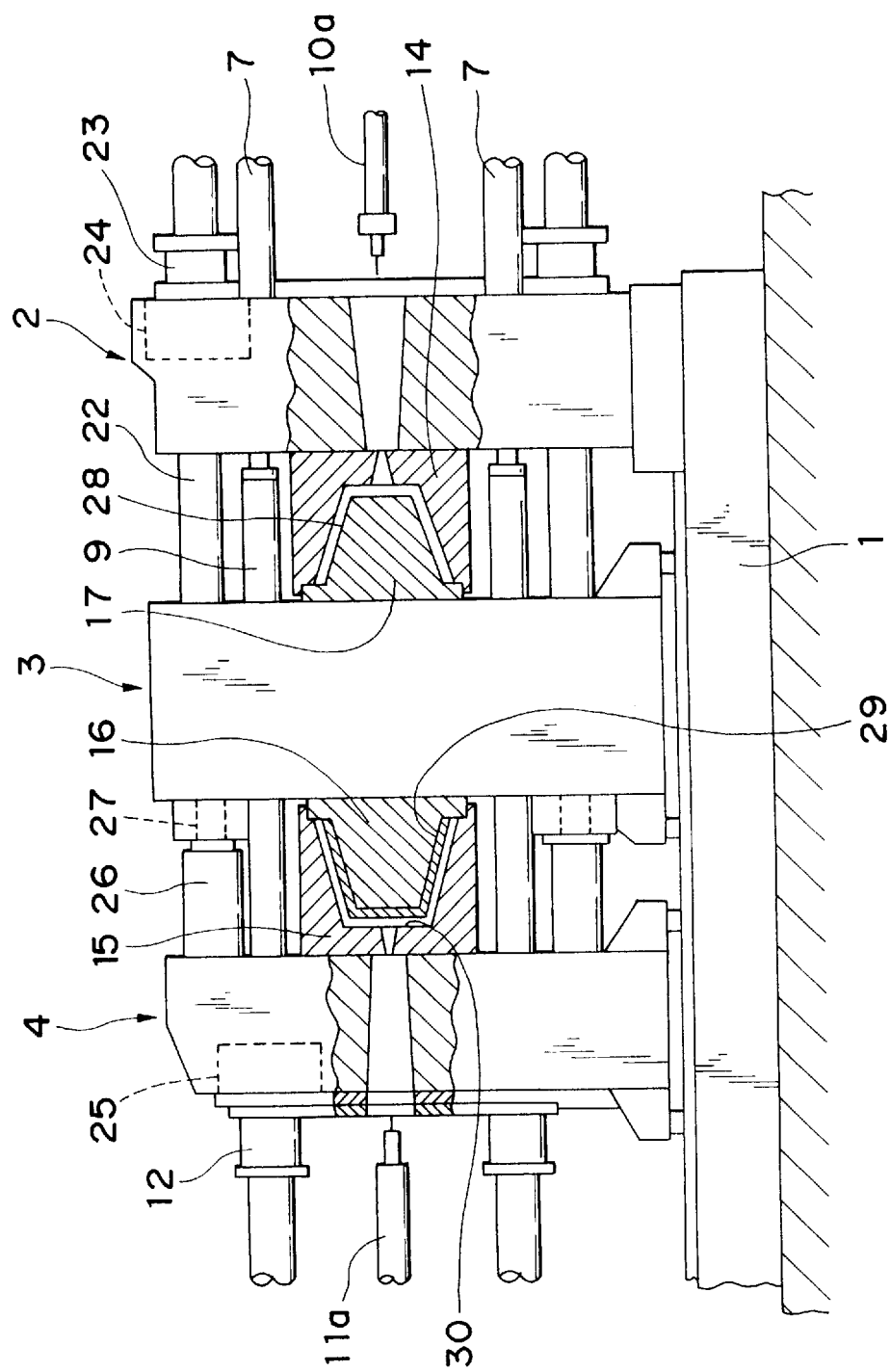
FIG. 7 is a partly broken-out side view showing a state in which the primary molds of the machine are closed.

Following that, the half nut 13 is closed by the driving unit (not shown) to connect the rotary plate 3 with the tie rod 9 so that they move in a body. Then, the movable plate 4 and the rotary plate 3 are both moved toward the fixed plate 2 by a suction operation of the moving cylinder 7, the primary molds 14 and 17 are clamped in contact by the mold clamping cylinder 24 and another first cavity 28 is created by the molds 14 and 17 as shown in FIG. 7. It is noted that the shift from the initial state to the state shown in FIG. 3 is performed through the similar processes shown in FIGS. 4 through 7.

In the state of FIG. 7, high pressure oil is introduced to the mold clamping cylinder 24 to apply a pressure toward the right in the figure to the tie rod 22 by a piston (not shown) of the cylinder 24 via the half nut 23. Thereby, the rotary plate 3 is pressed toward the right and the primary molds 14 and 17 are clamped. Similarly, high pressure oil is introduced also to the mold clamping cylinder 25 to apply a pressure toward the right in the figure to the tie rod 9 by a piston (not shown) of the cylinder 25 via the half nut 12. Thereby, the movable plate 4 is also pressed toward the right in the figure and the secondary molds 15 and 16 are clamped.

After completing the clamping as described above, a foaming material 31 such as styrene elastomer containing a foaming agent is injected and filled into the second cavity 30 created between the secondary core member 29 and the secondary cavity 15 from the nozzle 11a of the secondary injection unit 11 with a predetermined injection pressure. At the same time, the core material is supplied from the nozzle 10a of the primary injection unit 10 to the first cavity 28 created between the primary molds 14 and 17 to mold another core member 29 simultaneously as a primary mold.

Figure 8:
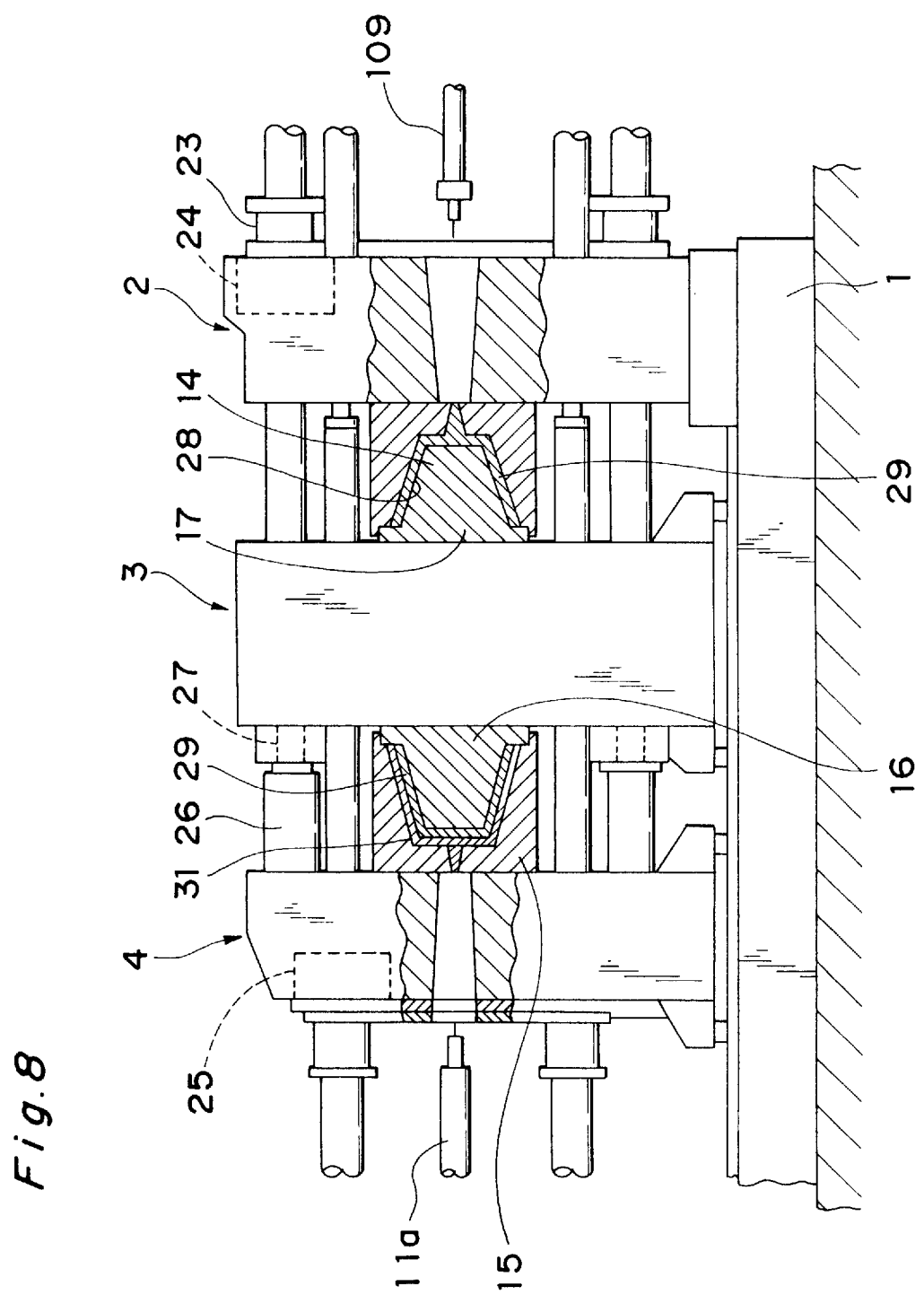
FIG. 8 is a partly broken-out side view showing a state in which molding materials are supplied to the primary and secondary molds of the machine.
Figure 9:
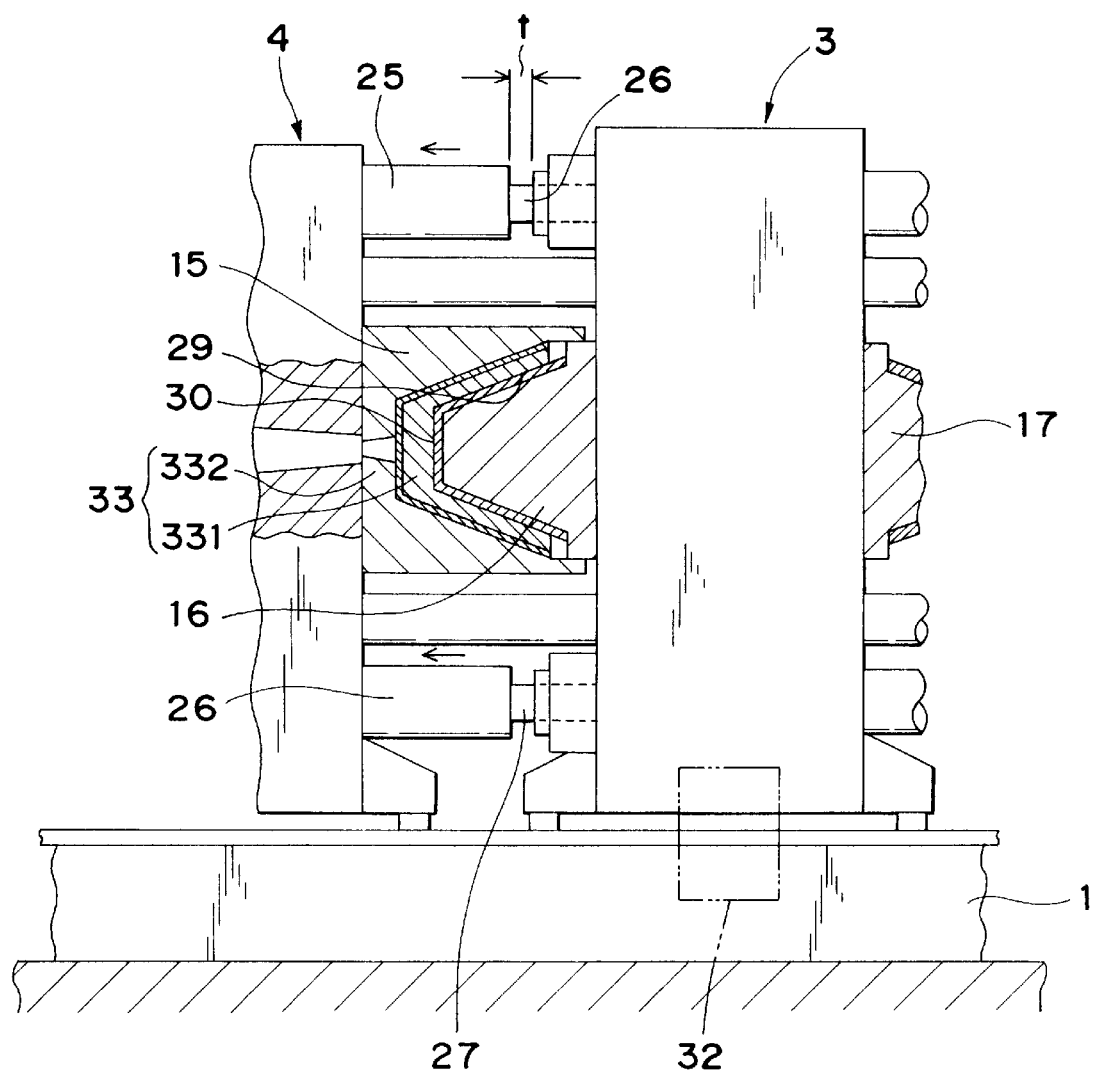
FIG. 9 is a partly broken-out side view of the main part of the machine showing a state in which the foaming material is foamed.

When a hydraulic pressure is generated in the mold opening cylinder 26 so that it exceeds a hydraulic pressure of the mold clamping cylinder 25 on the left in the state in FIG. 8, an opening force of the mold opening cylinder 26 exceeds the clamping force of the mold clamping cylinder 25. At this time, because the rotary plate 3 is fixed to the base 1 by a cotter 32, the piston rod 27 of the mold opening cylinder 26 extends and the movable plate 4, i.e. the secondary cavity 15, is moved toward the left by a predetermined stroke t (e.g. 4 mm), thus increasing the space of the second cavity 30 that much as shown in FIG. 9. Thereby, a pressure in the foaming material 31 drops below the foaming critical pressure, thus causing foaming within the foaming material 31 and creating a foam layer 331. The foaming material 31 at the portion in contact with the secondary cavity 15 is cold-set in a non-foaming state, thus creating a hard non-foamed skin layer 332.

The rate for expanding the space of the second cavity 30, i.e. an opening speed of the secondary cavity 15 from the first core 16, is controlled by the mold opening cylinder 26 in high precision, e.g. 2.0 m/sec. Foam moldings having any expansion ratio or thickness of the skin layer 332 and a good surface condition may be obtained by setting the mold opening speed adequately. That is, if the opening speed is too fast, the expansion ratio is increased, foam cells become large, the skin layer 332 is thickened and the foam layer 331 is thinned extremely. To the contrary, it the opening speed is too slow contrary, the expansion ratio becomes low, foam cells become small, the skin layer 332 is thinned extremely and the size of the foam cells in the foam layer 331 becomes irregular. However, the present invention allows desirable good foam moldings to be obtained because the use of the mold opening cylinder 26 allows the mold opening speed to be controlled in high precision.

Figure 10:
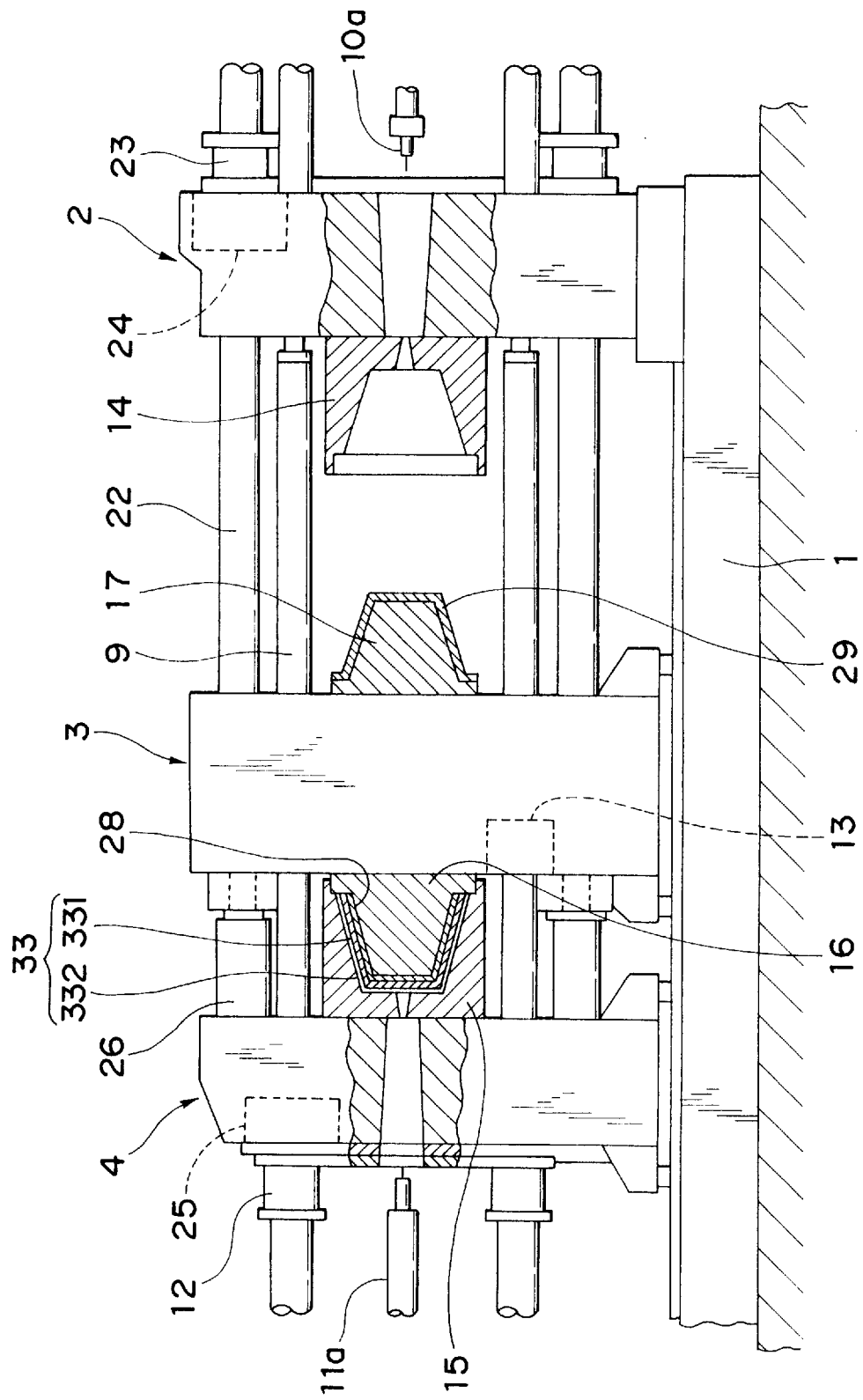
FIG. 10 is a partly broken-out side view showing a state in which the primary molds of the machine are opened.

Once a surface member 33 composed of the foam layer 331 and the skin layer 332 is laminated and molded in a body on the core member 29 as shown in FIG. 9, the half nut 23 is opened after releasing the cotter 32 and the moving cylinder 7 is actuated so as to extend its piston rod. Accordingly, the rotary plate 3 and the movable plate 4 are moved toward the left while leaving the molded core member 29 on the second core 17 and the primary molds 14 and 17 are opened as shown in FIG. 10.

Figure 11:
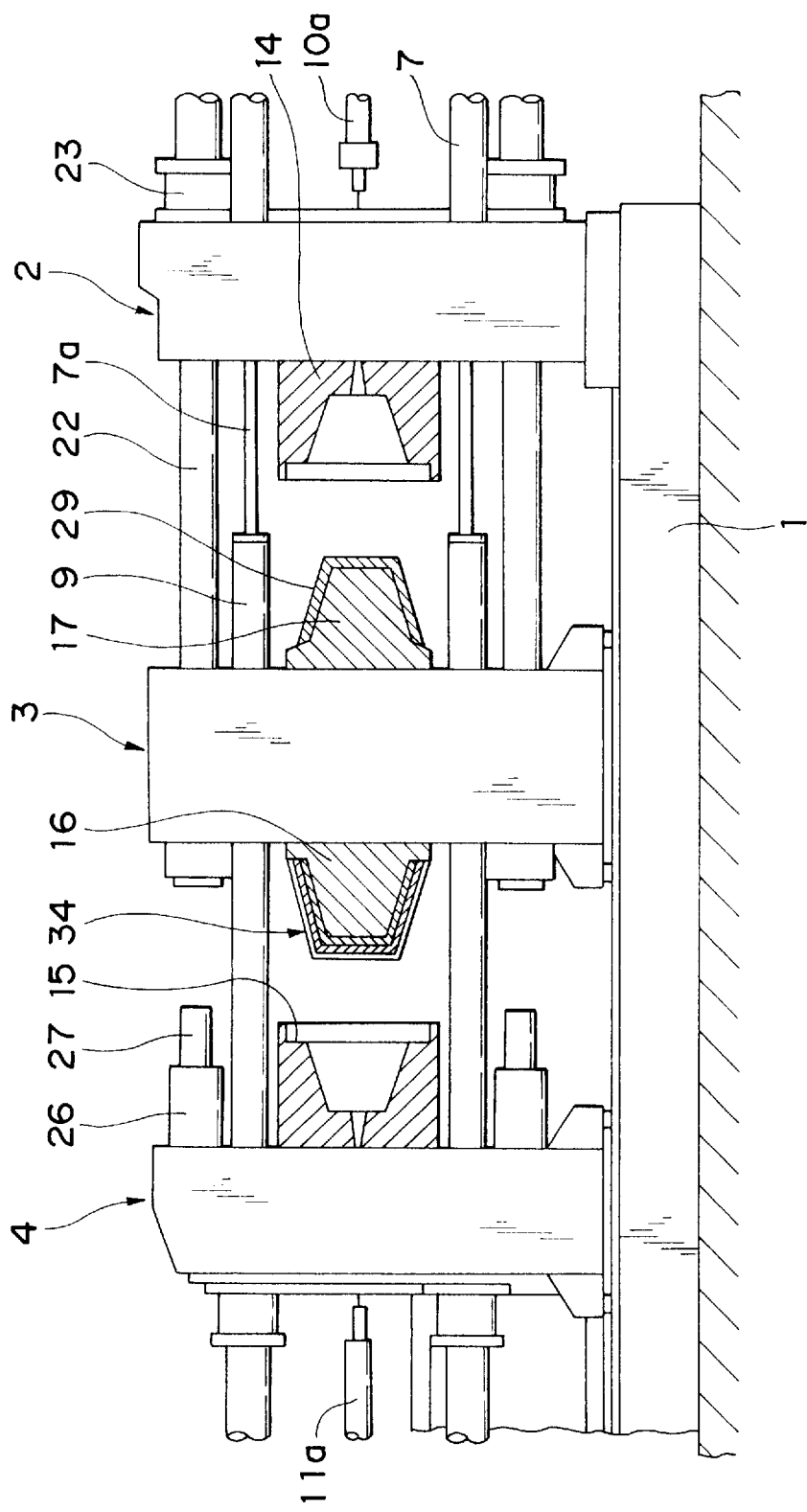
FIG. 11 is a partly broken-out side view showing a state in which the secondary molds of the machine are opened.

When the rotary plate 3 is moved to a predetermined position, the half nut 13 provided in the rotary plate 3 is opened. Thereby, the movable plate 4 is moved toward the left further by the extension of the piston rod 7a of the moving cylinder 7 and the secondary molds 15 and 16 are opened as shown in FIG. 11. Following that, the foam molding 34 in which the core member 29 and the surface member 33 are laminated in a body and which is adhering on the first core 16 is taken out. Then, turning the rotator 20 of the rotary plate 3 by 180° brings about the initial state shown in FIG. 5 again, thus ending the molding cycle.

As described above, the second cavity 30 having the space for filling, foaming and cold-setting the foaming material 31 is created between the core member 29 and the secondary cavity 15 while leaving the core member 29 on the first core 16 or the second core 17 and the surface member 33 composed of the foam layer 331 and the skin layer 332 is laminated and molded in a body on the core member 29. Due to that, because the composite foam molding 34 composed of the core member 29 and the surface member 33 can be produced continuously by one molding machine and the core member 29 and the surface member 33 can be molded at the same time, the production efficiency is significantly improved.

It is noted that in case a large machine requiring a large mold clamping force is employed, the amount of oil required for the large machine may be reduced and the mold opening/clamping speed may be increased if hydro-mechanical clamping unit is used for the clamping cylinders 24 and 25 and their stroke fully satisfies the foaming mold opening stroke.

While the case in which the mold opening force of the mold opening cylinder 26 exceeds the clamping force of the mold clamping cylinder 25 has been described above, the opening force of the mold opening cylinder 26 may be small if the mold clamping cylinder 25 is put into a released state or a low pressure state close to the released state. However, it is difficult to put only the secondary molds into the released state when the mold clamping cylinder 24 for the primary molds and the mold clamping cylinder 25 for the secondary molds are common.

Figure 12:
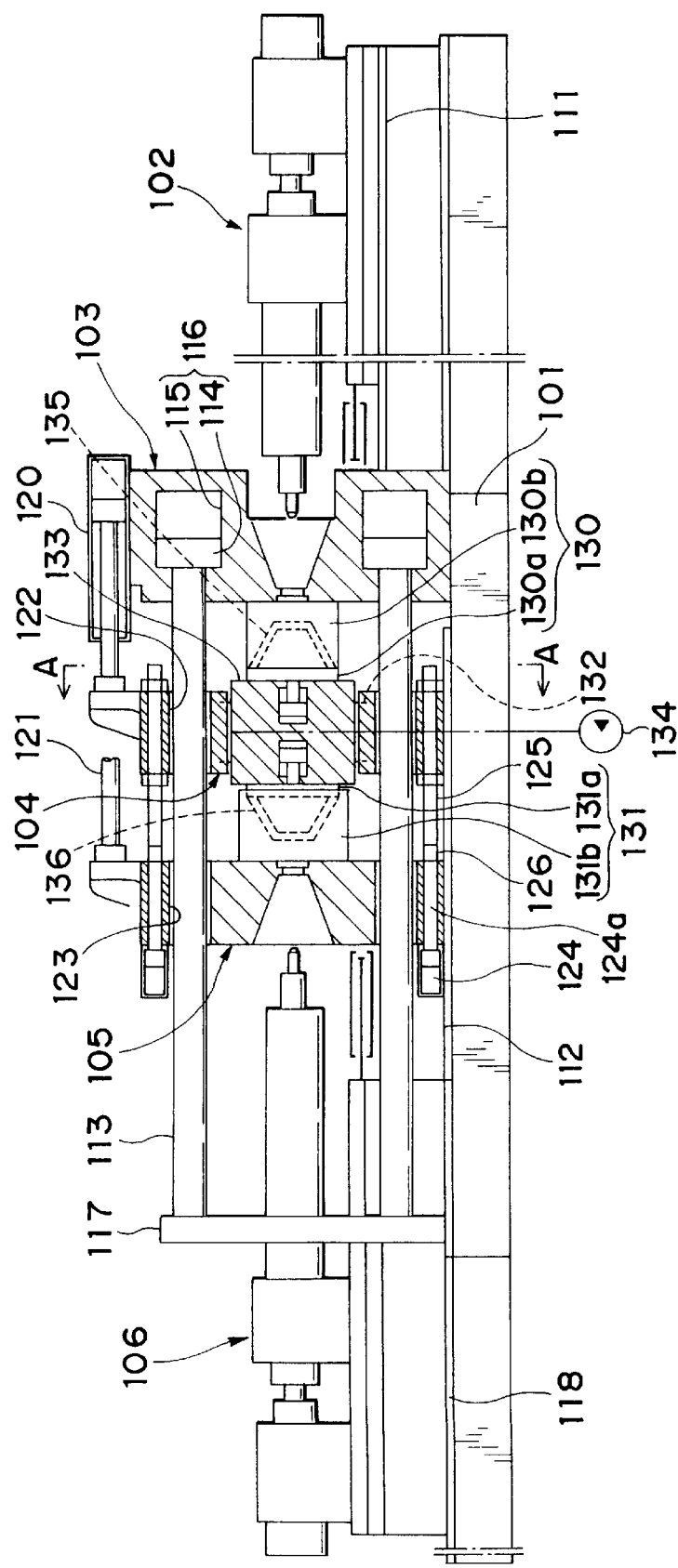
FIG. 12 is a longitudinal section view of another inventive two-layer foam injection molding machine in a fully closed state.
Figure 13:
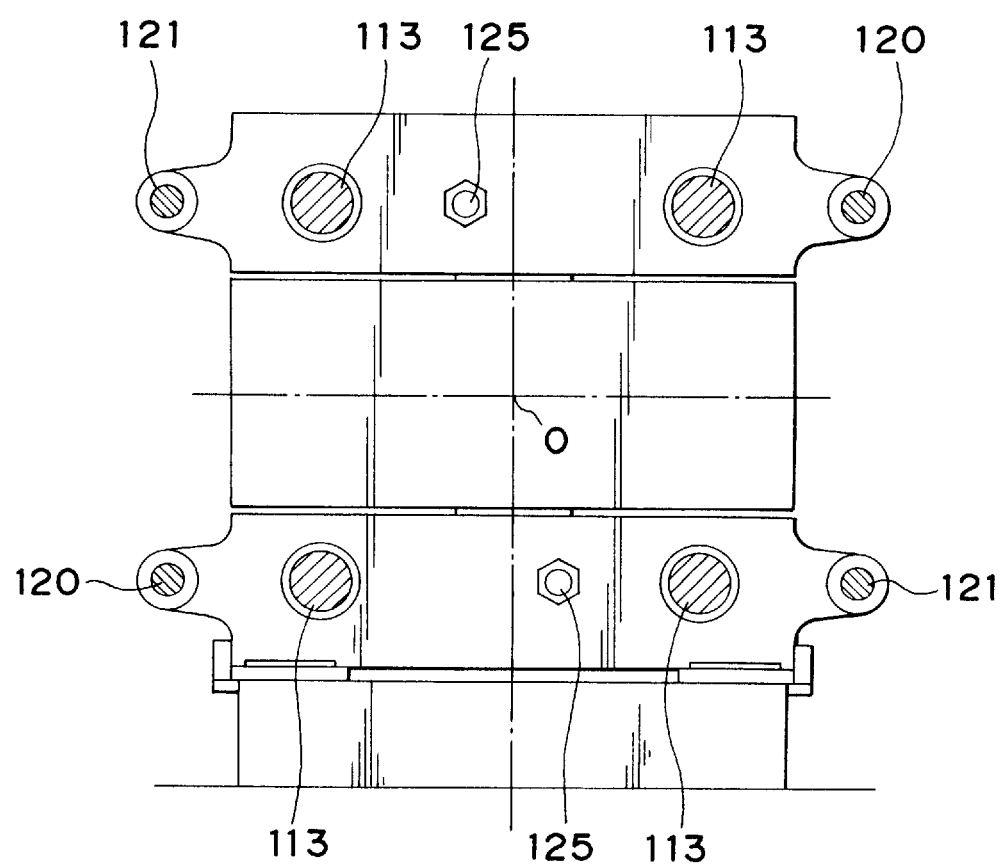
FIG. 13 is a section view along a line A—A in FIG. 12.

Another inventive two-layer foam injection molding machine which can put only the secondary mold into the released state even when a common mold clamping cylinder is used for the primary and secondary molds will be explained below with reference to FIGS. 12 through 16. FIG. 12 is a longitudinal section view of the other inventive two-layer foam injection molding machine in a fully closed state, FIG. 13 is a section view along a line A—A in FIG. 12 and FIG. 14 is a longitudinal section view showing the other inventive two-layer foam injection molding machine in a fully opened state.

In FIG. 12, provided on a common bed 101 sequentially from the right in the figure are a first injection unit 102, a fixed plate 103, a rotary plate 104, a movable plate 105 and a second injection unit 106.

The first injection unit 102 is provided slidably on slide rails 111 and the whole unit is moved toward the left in the figure by a hydraulic cylinder during injection. The rotary plate 104 and the movable plate 105 are arranged so as to be slidable on slide rails 112 and to be penetrated through tie bars 113 projecting from the fixed plate 103. One end of the tie bar 113 is a piston 114, thus forming a mold clamping cylinder 116 together with a cylinder 115 within the fixed plate 103. Fixed to the other end of the tie bar 113 is an end plate 117 whose lower part is arranged to be slidable on the slide rails 112. The second injection unit 106 is provided slidably on slide rails 118 and the whole unit is moved toward the right in the figure during injection.

Interposed between the rotary plate 104 and the fixed plate 103 is a first opening/closing cylinder 120 whose extension or reduction causes an opening or closing operation of the rotary plate 104 as against the fixed plate 103. Interposed similarly between the movable plate 105 and the fixed plate 103 is a second opening/closing cylinder 121 whose elongation or reduction causes an opening or closing operation of the movable plate 105 as against the fixed plate 103. Further, first lock means 122 is provided between the rotary plate 104 and the tie bars 113 and second lock means 123 is provided between the movable plate 105 and the tie bars 113. Those lock means 122 and 123 lock the rotary plate 104 and the movable plate 105 respectively to the tie bars 113 or cause them to be movable.

Further, a mold opening cylinder 124 is provided between the rotary plate 104 and the movable plate 105. That is, a micrometer head 126 is spiral-fitted at an edge of a rod 125 projecting from the rotary plate 104 and an edge of a rod 124a of the mold opening cylinder 124 abuts the micrometer head 126. When oil under pressure is introduced to a cylinder chamber of the mold opening cylinder 124 and its rod extends to the stroke end, the movable plate 105 is opened by a predetermined distance. This predetermined distance may be freely adjusted by turning the micrometer head 126.

FIG. 13 shows a configuration of the tie bars 113, the first opening/closing cylinder 120, the second opening/closing cylinder 121 and the mold opening cylinder 124 (rod 125). The four tie bars 113 are disposed at four corners, each two first opening/clamping cylinders 120 and second opening/clamping cylinders 121 are disposed on diagonal lines which cross each other and the two rods 125 are disposed point-symmetrically about a center O.

Returning to FIG. 12, primary molds 130 are attached between the fixed plate 103 and the rotary plate 104 and secondary molds 131 are attached between the rotary plate 104 and the movable plate 105. Specifically, the rotary plate 104 is provided with a rotator 133 which is turnable about an axis 132. A core 130a of the primary molds 130 and a core 131a of the secondary molds 131, both having the same shape, are attached to the rotator 133. The rotator 133 can be turned by a rotary actuator 134 within a horizontal plane per 180°, thus switching the position of the core 130a of the molds 130 and the core 131a of the secondary molds 131. Further, a primary molding cavity 135 is created in the primary molds 130 and a secondary molding cavity 136 is created in the secondary molds 131. The secondary molding cavity 136 is made wider than the primary cavity 135 so as to inject on the primary molding layer. The secondary molding cavity 136 is widened further by the mold opening cylinder 124 described above to foam a secondary molding layer injected on the primary molding layer.

The rotary plate 104 and the movable plate 105 may be fully opened by extending the first opening/closing cylinder 120 and the second opening/closing cylinder 121 as shown in FIG. 14 to take out moldings from the secondary mold 131 or to turn the rotator 133 by 180°. Then, when the first opening/closing cylinder 120 and the second opening/closing cylinder 121 are shortened, the fixed plate 103, the rotary plate 104 and the movable plate 105 are all closed as shown in FIG. 12.

Figure 15A:
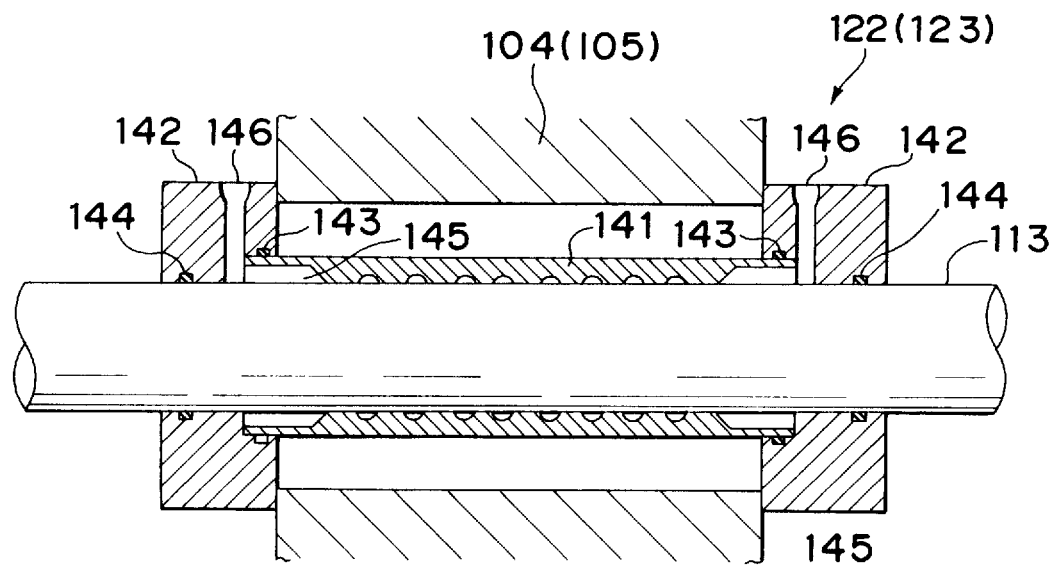
FIGS. 15a and 15b are section views showing a structure and operation of lock means.
Figure 15B:
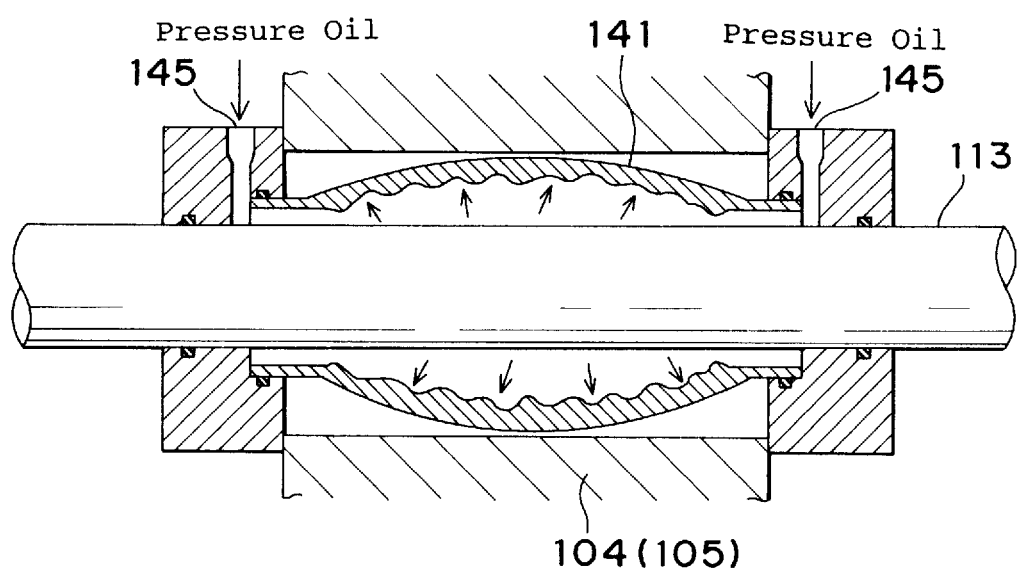

The structure and operation of the preferable first and second lock means 122 and 123 will be explained with reference to FIGS. 15a and 15b. FIG. 15a is a section view showing a locked state and FIG. 15b is a section view showing an unlocked state.

In FIG. 15a, a sleeve 141 for the tie bars 113 is fixed to the rotary plate 104 or the movable plate 105 through the intermediary of double-end flanges 142. The sleeve 141 has an inner diameter which tight-fits with the tie bars 113 and normally grips the tie bars 113 in a body. The sleeve 141 is also elastically deformable, a seal 143 is provided between the sleeve 141 and the double-end flange 142 and a seal 144 is provided between the sleeve 141 and the tie bars 113 to create a pressure oil chamber 145. Due to that, when oil under pressure is supplied from a port 146, the sleeve 141 expands and a gap is created between it and the tie bars 113 as shown in FIG. 15b, thus moving the rotary plate 104 or the movable plate 105 smoothly as against the tie bars 113. Discharging the oil under pressure from the port 146 returns the lock means to the locked state in FIG. 15a. The lock means 122 and 123 can create the locked state at any position of the tie bars 113.

Figure 16A:
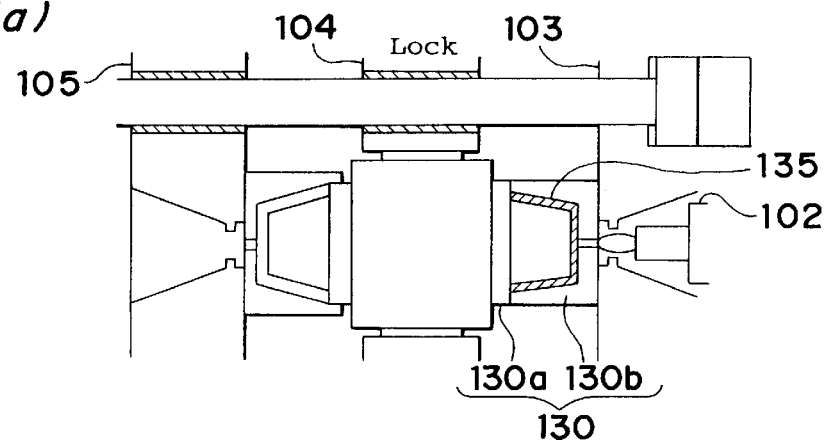
FIGS. 16a through 16d are side views for explaining an operation of the other inventive two-layer foam injection molding machine.

A process for molding the two-layer foam moldings by means of the two-layer foam injection molding machine described above will be explained below with reference to FIGS. 16a through d. FIG. 16a shows a preparatory process and FIGS. 16b through 16d show repetitive processes.

In FIG. 16a, at least the rotary plate 104 is closed to the fixed plate 103 to inject a hard resin to the first cavity 135 of the primary mold 130 by the first injection unit 102 and to form a primary molding, i.e. a core member, on the core 130a.

Figure 16B:
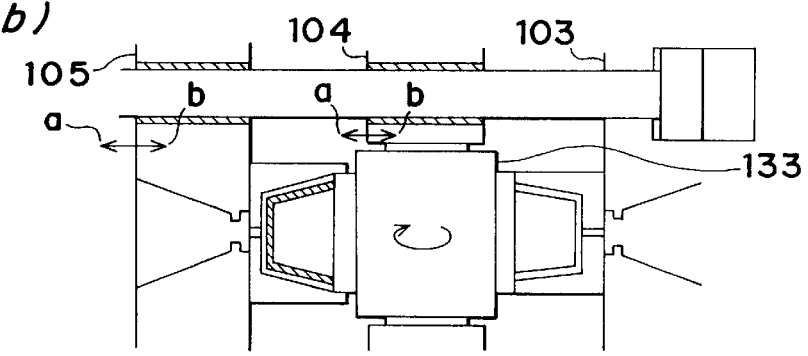

Then, in FIG. 16b, the rotary plate 104 and the movable plate 105 are fully opened by opening as indicated by arrow a to turn the rotator 133 of the rotary plate 104 by 180° so that the core member is positioned at the secondary molds. Then, the rotary plate 104 and the movable plate 105 are fully closed by closing as indicated by arrow b.

Figure 16C:
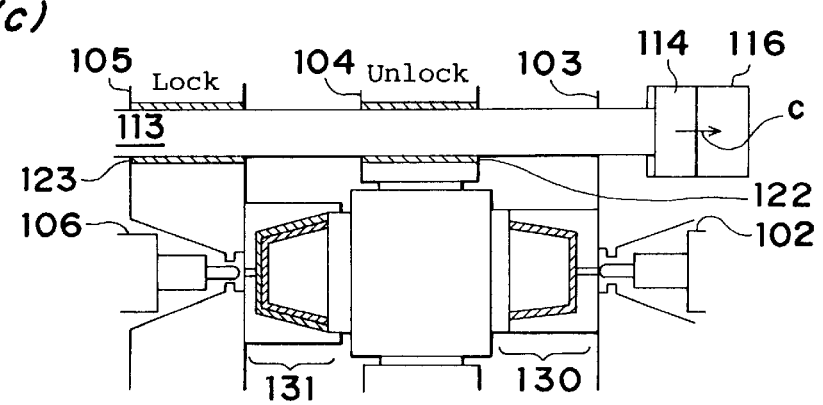
Figure 16D:
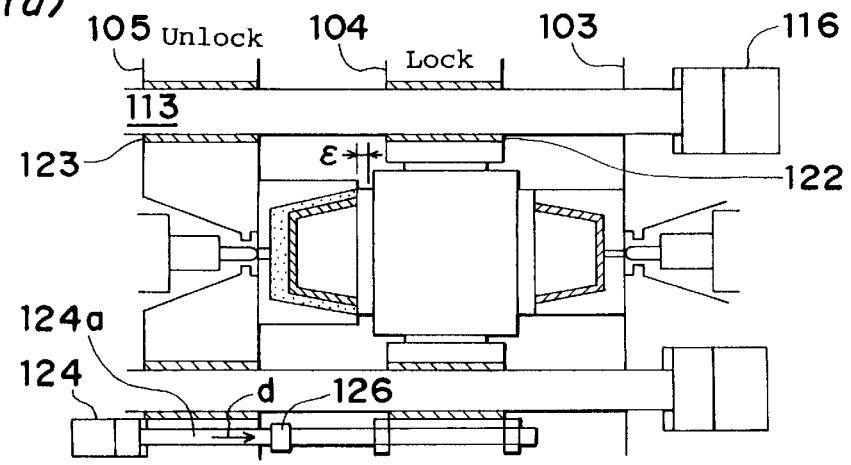

In FIG. 16c, the lock means 123 of the movable plate 105 is locked to put the tie bars 113 and the movable plate 105 into one body. At this time, the first lock means 122 of the rotary plate 104 is kept unlocked. Then, when oil under pressure is supplied to a rod side chamber of the mold clamping cylinder 116 and the piston 114 is pulled into the direction of arrow c, the rotary plate 104 and the movable plate 105 are co-clamped as against the fixed plate 103. Injection is performed in this state by the first injection unit 102 and the second injection unit 106. As a result, a new core member is formed in the primary mold 130 and a foaming resin is laminated on the core member in the secondary mold 131. Putting the first lock means 122 of the rotary plate 104 into the locked state from the unlocked state and the second lock means 123 of the movable plate 105 into the unlocked state from the locked state in FIG. 16d switches to a sole mold clamping state in which only the rotary plate 104 is clamped by the mold clamping cylinder 116 as against the fixed plate 103. Then, when the rod 124a of the mold opening cylinder 124 is extended in the direction of arrow d, the edge of the rod 124a abuts to the micrometer head 126, the movable plate 105 moves toward left in the figure and the molds are opened by a distance e. Then, the foaming resin is foamed and a laminated molding of a surface member composed of a surface skin layer and an inner foam layer with the core member is formed. When the laminated molding is cooled, the mold clamping cylinder 116 is released and the first lock means 122 is also unlocked.

Then, the first opening/closing cylinder 120 and the second opening/closing cylinder 121 are extended to fully open the molds as shown in FIG. 14. Next, the laminated molding is taken out and the rotator 133 of the rotary plate 104 is turned by 180°. Then, the first opening/closing cylinder 120 and the second opening/closing cylinder 121 are shortened to put into the fully closed state shown in FIG. 1. This state corresponds to the state in FIG. 16b and the molding cycle of FIGS. 16c through 16d is repeated again.

As described above, even when the mold clamping cylinder 116 is used commonly for the primary and secondary molds, the clamping is switched from co-clamping of the primary and secondary molds to sole clamping of the primary mold and the opening of the secondary mold for foaming is performed smoothly by switching the first and second lock means 122 and 123. Further, using the first and second lock means 122 and 123 having the elastic deformable member 141 for gripping the tie bars 113 allows the tie bars 113 to be gripped at any position. Thereby, a cumbersome adjustment such as an adjustment of a grip position which might be necessary pursuant to a change of a thickness of molds becomes needless, allowing to accommodate with switching of arrangements quickly.

As described above, the inventive two-layer foam injection molding machine is suited for efficiently obtaining the composite foam molding in which the surface member having the skin layer on the surface of the foam layer having cushion is formed in a body on one side of the core member made from a hard resin and which is used for car interior panels such as an instrument panel, a door panel, a seat back panel, a steering wheel and a handle, for furnitures such as a seat portion of a chair and for sundry goods such as shoes and slippers.

While preferred embodiments have been described, variations thereto will occur to those skilled in the art within the scope of the present inventive concepts which are delineated by the following claims.

What is claimed is:

1. A two-layer foam injection molding machine for molding foam moldings in which a surface member composed of a foam layer and a skin layer on the surface of said foam layer is laminated in a body on a core member made from a hard resin, comprising:

a fixed plate attached to a primary mold for molding said core member, said fixed plate provided with a primary injection unit for supplying a material of said core member;

a rotary plate having a first mold facing said primary mold and a second mold facing a secondary mold having the same shape as said primary mold;

said rotary plate being capable of turning said first and second mold so that said first mold faces said secondary mold and said second mold faces said primary mold;

a movable plate attached to said secondary mold and provided with a secondary injection unit for supplying a material of said surface member;

first mold clamping means for clamping said primary mold of said fixed plate to one of said first mold and said second mold of said rotary plate;

second mold clamping means for clamping said secondary mold of said movable plate to one of said second mold and said first mold of said rotary plate; and mold opening means provided so as to separate said movable plate and said rotary plate to provide a space between said second mold or said first mold and said secondary mold held to be openable, wherein said rotary plate and said movable plate are guided by a plurality of tie bars projecting from said fixed plate and are openable and closable;

said first mold clamping means comprises first lock means which is provided for said rotary plate and can lock or unlock said tie bars and a mold clamping cylinder provided in said fixed plate to advance and retract said tie bars;

said second mold clamping means comprises second lock means which is provided for said movable plate and can lock or unlock said tie bars and said mold clamping cylinder; and said mold opening means can perform the mold opening operation while said second lock means is unlocked.

2. The two-layer foam injection molding machine according to claim 1, wherein said second mold clamping means can release the molds while said first mold clamping means clamps the molds and said mold opening means provides for said space between said second mold or said first mold and said secondary mold by a predetermined distance while said second clamping means releases the molds.

3. The two-layer foam injection molding machine according to claim 1, wherein said first lock means and said lock means comprise an elastic deformable member for gripping said tie bars and hydraulic operating means for expanding or reducing said elastic deformable member.

* * * * *